(12) United States Patent
Nam et al.

(10) Patent No.: US 11,677,522 B2
(45) Date of Patent: Jun. 13, 2023

(54) METHOD AND DEVICE FOR REMOVING PHASE NOISE IN WIRELESS COMMUNICATION SYSTEM

(71) Applicant: Samsung Electronics Co., Ltd., Suwon-si (KR)

(72) Inventors: Hyungju Nam, Gwangmyeong-si (KR); Hyunil Yoo, Suwon-si (KR); Taeyoung Kim, Seoul (KR); Jeehwan Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 16/644,041

(22) PCT Filed: Sep. 11, 2018

(86) PCT No.: PCT/KR2018/010618
§ 371 (c)(1),
(2) Date: Mar. 3, 2020

(87) PCT Pub. No.: WO2019/050378
PCT Pub. Date: Mar. 14, 2019

(65) Prior Publication Data
US 2021/0167909 A1    Jun. 3, 2021

(30) Foreign Application Priority Data

Sep. 11, 2017  (KR) .................. 10-2017-0116215
Sep. 29, 2017  (KR) .................. 10-2017-0128087

(51) Int. Cl.
*H04L 5/00*  (2006.01)
*H04L 27/26*  (2006.01)

(52) U.S. Cl.
CPC .......... *H04L 5/0048* (2013.01); *H04L 5/0023* (2013.01); *H04L 27/2613* (2013.01)

(58) Field of Classification Search
CPC ..... H04L 5/0023; H04L 5/0048; H04L 5/005; H04L 5/0073; H04L 25/0224; H04L 25/03006; H04L 27/2613
See application file for complete search history.

(56) References Cited

U.S. PATENT DOCUMENTS

2016/0006594 A1    1/2016  Persson et al.
2019/0052433 A1    2/2019  Yoo et al.
(Continued)

FOREIGN PATENT DOCUMENTS

KR    10-2019-0017302 A    2/2019

OTHER PUBLICATIONS

Phase-Tracking Reference Signal Design for High-Frequency Systems, RI-1703406, 3GPP TSG RAN WGI Meeting #88, Athens, Greece, Feb. 7, 2017.
(Continued)

*Primary Examiner* — David B Lugo
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various embodiments of the present disclosure, an operating method of a base station includes determining at least one sub-carrier for allocating a phase tracking reference signal (PTRS), transmitting information relating to the PTRS allocation to a terminal, and based on the information, transmitting the PTRS to the terminal through the at least one sub-carrier. An apparatus and a method according to various embodiments of the present disclosure, may determine a sub-carrier for PTRS allocation and provide information relating to the PTRS allocation to a terminal, thus
(Continued)

controlling PTRS interference caused from neighboring base stations and improving PTRS tracking performance.

14 Claims, 16 Drawing Sheets

(56) References Cited

U.S. PATENT DOCUMENTS

| | | | | |
|---|---|---|---|---|
| 2019/0356463 | A1* | 11/2019 | Zhang | H04W 80/08 |
| 2020/0195399 | A1* | 6/2020 | Sano | H04L 5/1469 |
| 2020/0259609 | A1* | 8/2020 | Saito | H04L 5/0048 |
| 2020/0287687 | A1* | 9/2020 | Li | H04L 5/0051 |
| 2021/0135922 | A1* | 5/2021 | Gao | H04B 7/005 |

OTHER PUBLICATIONS

Further details for PT-RS design, RI-1700073, 3GPP TSG RAN WGI, Meeting Ad Hoc for NR, Spokane, USA, Jan. 9, 2017.
Jian Luo, 'Final radio interface concepts and evaluations for mm-wave mobile communications', In: Millimetre-Wave Based Mobile Radio Access Network for Fifth Generation Integrated Communications, Document No. H2020-ICT-671650-mmMAGIC/D4.2, pp. 1-162, Jun. 30, 2017.
Samsung, "On DL PT-RS design", 3GPP TSG RAN WG1 NR Ad-hoc#2, Qingdao, China, Jun. 27-30, 2017, R1-1710686.
Panasonic, "PT-RS design", 3GPP TSG RAN WG1 Meeting #90, Prague, Czechia, Aug. 21-25, 2017, R1-1713021.
Korean Office Action dated Dec. 13, 2021, issued in Korean Application No. 10-2017-0128087.
Korean Notice of Patent Grant dated Jun. 15, 2022, issued in Korean Application No. 10-2017-0128087.

* cited by examiner

METHOD AND DEVICE FOR REMOVING PHASE NOISE IN WIRELESS COMMUNICATION SYSTEM

TECHNICAL FIELD

The present disclosure relates to a wireless communication system, and more particularly, to an apparatus and a method for removing phase noise in the wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

If communication is performed in a high frequency band, considerable signal attenuation may occur due to phase noise. The phase noise may result from imperfection of an oscillator. Particularly, in a communication environment using a high-order modulation scheme (e.g., 16 quadrature amplitude modulation (QAM), 64 QAM, 256 QAM), common phase error (CPE) and inter-carrier interference (ICI) occurring due to the phase noise cause the signal attenuation, and as a result, signal recovery capability of a terminal may abruptly decrease. Hence, a method for removing and/or compensating for the phase noise is demanded.

DISCLOSURE OF INVENTION

Technical Problem

Based on the discussions described above, the present disclosure provides an apparatus and a method removing phase noise in a wireless communication system.

In addition, the present disclosure provides an apparatus and a method for processing a phase tracking reference signal (PTRS) to remove phase noise in a wireless communication system.

In addition, the present disclosure provides an apparatus and a method for determining a sub-carrier to which a PTRS is to be allocated in a wireless communication system.

In addition, the present disclosure provides an apparatus and a method for a base station to explicitly or implicitly indicate a sub-carrier to which a PTRS is allocated to a terminal in a wireless communication system.

In addition, the present disclosure provides an apparatus and a method for operating a PTRS in a multi-cell environment in a wireless communication system.

Solution to Problem

According to various embodiments of the present disclosure, an operating method of a base station in a wireless communication system includes determining at least one sub-carrier for allocating a phase tracking reference signal (PTRS), transmitting information relating to the PTRS allocation to a terminal, and based on the information, transmitting the PTRS to the terminal through the at least one sub-carrier.

According to various embodiments of the present disclosure, an operating method of a terminal in a wireless communication system includes receiving information relating to PTRS allocation from a base station, determining at least one sub-carrier allocated the PTRS, based on the information, and receiving the PTRS, through the at least one sub-carrier.

According to various embodiments of the present disclosure, an apparatus of a base station in a wireless communication system includes a control unit for determining at least one sub-carrier for PTRS allocation, and a communication unit for transmitting information relating to the PTRS allocation to a terminal, and transmitting the PTRS to the terminal through the at least one sub-carrier, based on the information.

According to various embodiments of the present disclosure, an apparatus of a terminal in a wireless communication system includes a communication unit for receiving information relating to PTRS allocation from a base station, and a control unit for determining at least one sub-carrier allocated the PTRS, based on the information, wherein the communication unit receives the PTRS, through the at least one sub-carrier.

Advantageous Effects of Invention

An apparatus and a method according to various embodiments of the present disclosure may, since a base station determines a sub-carrier for phase tracking reference signal (PTRS) allocation and transmits information relating to the PTRS allocation to a terminal, control PTRS interference caused from neighboring base stations and improve PTRS tracking performance.

Effects obtainable from the present disclosure are not limited to the above mentioned effects, and other effects which are not mentioned may be clearly understood by those skilled in the technical field to which the present disclosure belongs through the following descriptions.

BRIEF DESCRIPTION OF DRAWINGS

FIG. 14 illustrates an operating method of a base station 110.

BEST MODE FOR CARRYING OUT THE INVENTION

The terms used in the present disclosure are only used to describe specific embodiments, and are not intended to limit other embodiments. Singular expressions may include plural expressions as well unless the context clearly indicates otherwise. All terms used herein including technical and scientific terms may have the same meaning as those commonly understood by a person skilled in the art to which the present disclosure pertains. Terms such as those defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for removing phase noise in a wireless communication system. Specifically, the present disclosure describes a technique for determining a sub-carrier to which a phase tracking reference signal (PTRS) being a reference signal for estimating the phase noise is to be allocated, and indicating to a terminal the sub-carrier to which the PTRS is allocated in the wireless communication system.

Terms indicating signals, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standards (e.g., 3rd generation partnership (3GPP)), which is merely an example for explanations. Various embodiments of the present disclosure may be easily modified and applied in other communication systems.

Figure 1:
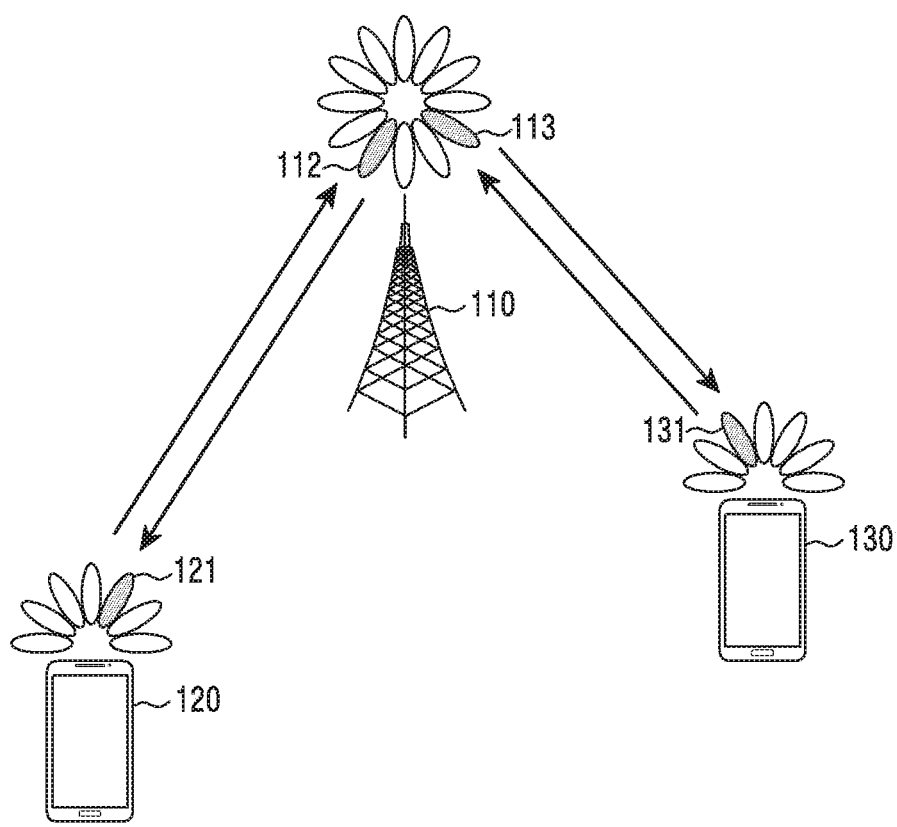
FIG. 1 illustrates a wireless communication system according to various embodiments of the present disclosure.

FIG. 1 illustrates a wireless communication system according to various embodiments of the present disclosure. FIG. 1 illustrates a base station 110, a terminal 120, and a terminal 130, as some of nodes which use a radio channel in the wireless communication system. While FIG. 1 depicts only one base station, other base station which is identical or similar to the base station 110 may be further included.

The base station 110 is a network infrastructure which provides radio access to the terminals 120 and 130. The base station 110 has coverage defined as a specific geographical area based on a signal transmission distance. The base station 110 may be referred to as, besides the base station, an access point (AP), an eNodeB (eNB), a 5th generation node (5G node), a wireless point, a transmission/reception point (TRP), or other terms having technically identical meaning The terminal 120 and the terminal 130 each are a device used by a user, and communicate with the base station 110 over a radio channel In some cases, at least one of the terminal 120 and the terminal 130 may operate without user's involvement. That is, at least one of the terminal 120 and the terminal 130 performs is a device which performs machine type communication (MTC), and may not be carried by the user. The terminal 120 and the terminal 130 each may be referred to as, besides the terminal, a user equipment (UE), a mobile station, a subscriber station, a remote terminal, a wireless terminal, a user device, or other term having a technically equivalent meaning The base station 110, the terminal 120, and the terminal 130 may transmit and receive radio signals in a millimeter wave (mmWave) band (e.g., 28 GHz, 30 GHz, 38 GHz, 60 GHz). In so doing, to improve channel gain, the base station 110, the terminal 120, and the terminal 130 may conduct beamforming Herein, the beamforming may include transmit beamforming and receive beamforming That is, the base station 110, the terminal 120, and the terminal 130 may apply directivity to a transmit signal or a received signal. For doing so, the base station 110 and the terminals 120 and 130 may select serving beams 112, 113, 121, and 131 through a beam search procedure. After the serving beams 112, 113, 121, and 131 are selected, communications may be performed using resources which are quasi co-located (QCL) with resources which carry the serving beams 112, 113, 121, and 131.

Figure 2:
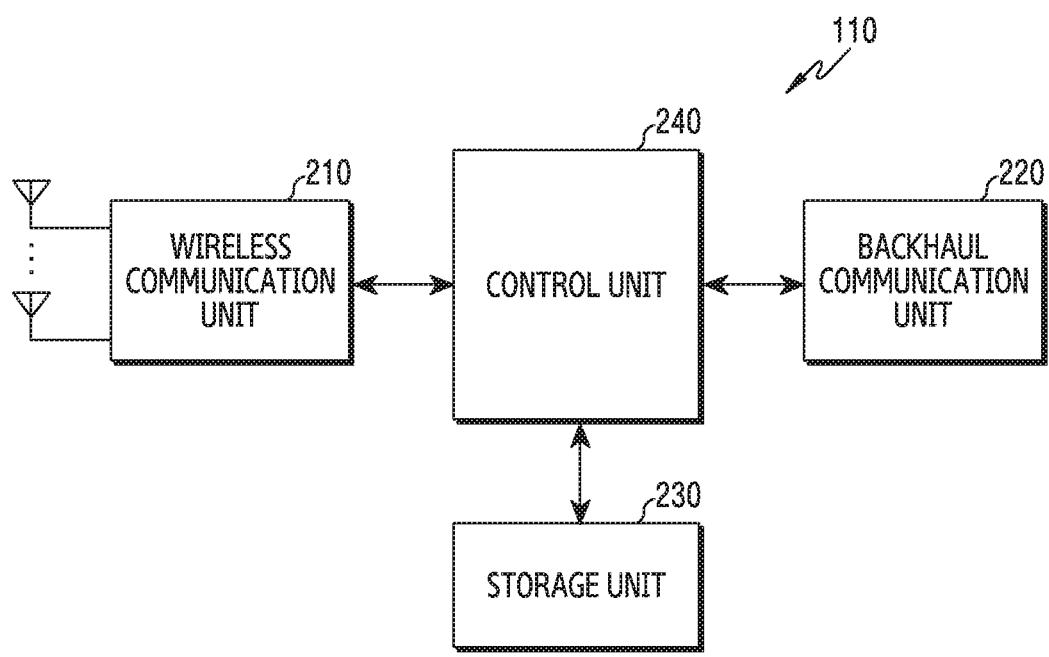
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration in FIG. 2 may be understood as the configuration of the base station 110. A term such as 'portion' or '~er' used hereafter indicates a unit for processing at least one function or operation, and may be implemented using hardware, software, or a combination of hardware and software.

Referring to FIG. 2, the base station 110 includes a wireless communication unit 210, a backhaul communication unit 220, a storage unit 230, and a control unit 240.

The wireless communication unit 210 may perform functions for transmitting and receiving signals over a radio channel For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal. Also, the wireless communication unit 210 up-converts the baseband signal to a radio frequency (RF) band signal, transmits it via an antenna, and down-converts an RF band signal received via an antenna to a baseband signal.

For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements. In terms of the hardware, the wireless communication unit 210 may include a digital unit and an analog unit, and the analog unit may include a plurality of sub-units according to an operating power and an operating frequency.

The wireless communication unit 210 transmits and receives the signals as stated above. Hence, all or part of the wireless communication unit 210 may be referred to as 'a transmitter', 'a receiver', or 'a transceiver'. Also, in the following, the transmission and the reception over the radio channel is used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station 110, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station 110. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. For doing so, the control unit 240 may include at least one processor.

According to various embodiments, the control unit 240 may determine at least one sub-carrier for PTRS allocation, transmit PTRS allocation information to a terminal by controlling the wireless communication unit 210, and transmit the PTRS to the terminal over at least one sub-carrier based on the PTRS allocation information. For example, the control unit 240 may control the base station 110 to perform operations according to various embodiments, to be described.

Figure 3:
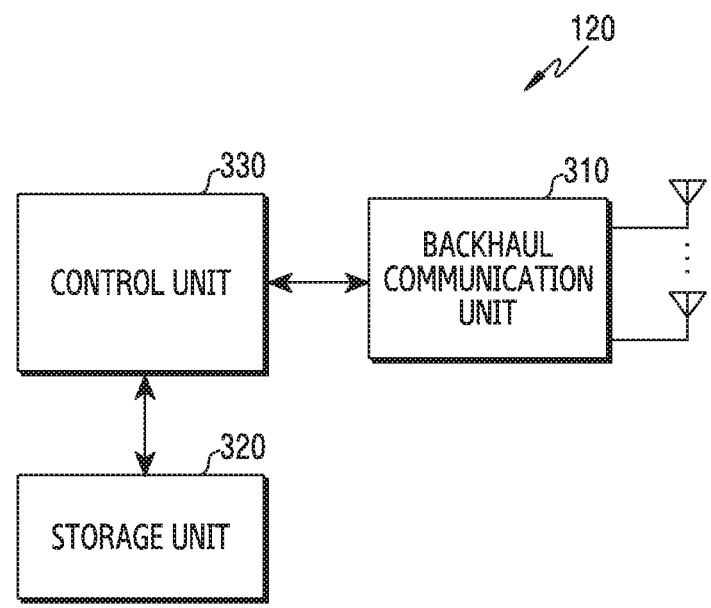
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration illustrated in FIG. 3 may be understood as the configuration of the terminal 120. A term such as 'portion' or '~er' used hereafter indicates a unit for processing at least one function or operation, and may be implemented using hardware, software, or a combination of hardware and software.

Referring to FIG. 3, the terminal 120 includes a communication unit 310, a storage unit 320, and a control unit 330.

The communication unit 310 may perform functions for transmitting and receiving signals over a radio channel For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the wireless communication unit 210 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 transmits and receives the signals as stated above. Hence, all or part of the communication unit 310 may be referred to as 'a transmitter', 'a receiver', or 'a transceiver'. In addition, the transmission and the reception over the radio channel are used as the meaning which embraces the above-stated processing of the communication unit 310 in the following explanations.

The storage unit 320 stores a basic program for operating the terminal 120, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal 120. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. In addition, part of the communication unit 310 and the control unit 330 may be referred to as a communication processor (CP). According to various embodiments, the control unit 330 may receive PTRS allocation information from a base station by controlling the communication unit 310, determine at least one sub-carrier allocated a PTRS based on the PTRS allocation information, receive the PTRS through at least one sub-carrier by controlling the communication unit 310. For example, the control unit 330 may control the terminal to carry out operations to be explained according to various embodiments.

The PTRS is a reference signal for tracking and/or compensating for phase distortion which may occur due to phase noise, Doppler effect, or synchronization error. The PTRS for estimating the phase distortion has the following characteristics 1. In single user—multiple input multiple output (SU-MIMO), the number of PTRS ports is equal to the number of RF chains of a transmitting stage (e.g., the base station 110).
2. In multi-user—MIMO (MU-MIMO), pre-coding performed on each PTRS port is the same as precoding on a demodulation reference signal (DMRS) port of a terminal which performs MU-MIMO.
3. Since the terminal may estimate inter-symbol phase distortion according to the PTRS, based on a channel estimated using the DMRS, a smaller number of PTRS ports than the number of DMRS ports is required.

A sub-carrier allocated the PTRS needs to be the same as a sub-carrier allocated with DMRS port. Hereinafter, "sub-carrier allocated the PTRS" may be referred to as a "frequency position of the PTRS" or a "frequency position of the PTRS port". If the frequency position of the PTRS port is fixed, the PTRS may be vulnerable to interference in a multi-cell environment. Accordingly, various embodiments of the present disclosure explain a technique for determining a sub-carrier to be allocated a PTRS and indicating the sub-carrier allocated the PTRS to the terminal.

Figure 4:
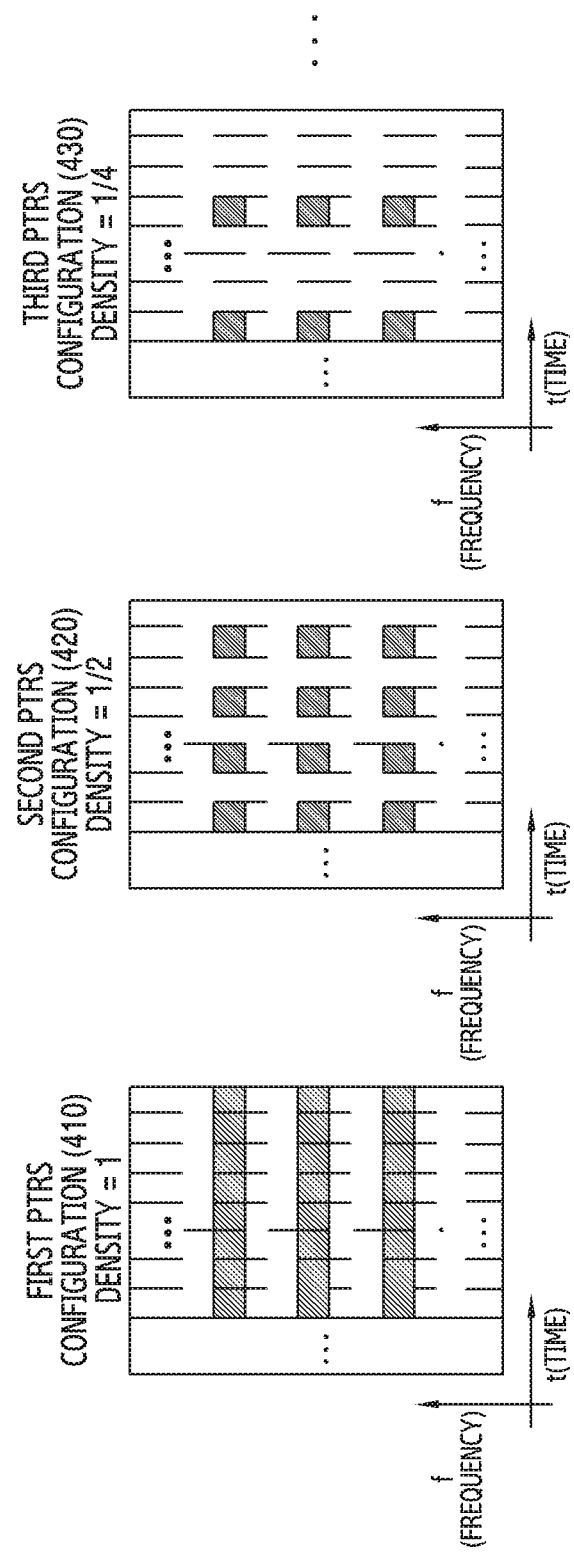
FIG. 4 illustrates an example of a configuration of a phase tracking reference signal (PTRS) in a wireless communication system according to various embodiments of the present disclosure.

FIG. 4 illustrates an example of a configuration of a PTRS in a wireless communication system according to various embodiments of the present disclosure. According to various embodiments of the present disclosure, the "configuration of the PTRS" indicates a configuration of a resource allocated the PTRS.

The configuration of the PTRS for compensating for effect of phase noise may be determined by various factors. For example, the effect of the phase noise may vary according to various factors such as sub-carrier spacing, a resource block (RB) scheduled for a terminal, a modulation and coding scheme (MCS) level, a signal to interference plus noise ratio (SINR), a channel, Doppler effect, a carrier frequency offset (CFO). This means that the configuration of the PTRS used to compensate for and/or track the phase noise may vary according to the transmission environment.

For example, as shown in a first PTRS configuration 410, the PTRS configuration may be configured by mapping the PTRS to every symbol on a time axis, wherein a density may be 1. As another example, as shown in a second PTRS configuration 420, the PTRS configuration may be configured by mapping the PTRS to every two symbols on the time axis, wherein the density may be ½. As yet another example, as shown in a third PTRS configuration 430, the PTRS configuration may be configured by mapping the PTRS to every four symbols on the time axis, wherein the density may be ¼. Although no depicted, the PTRS may be mapped to every RB, every two RBs, or every four RBs on a frequency axis. In those examples, the mapping unit (e.g., 1, 2, 4) are exemplary, and various mapping units may be applied.

Figure 5:
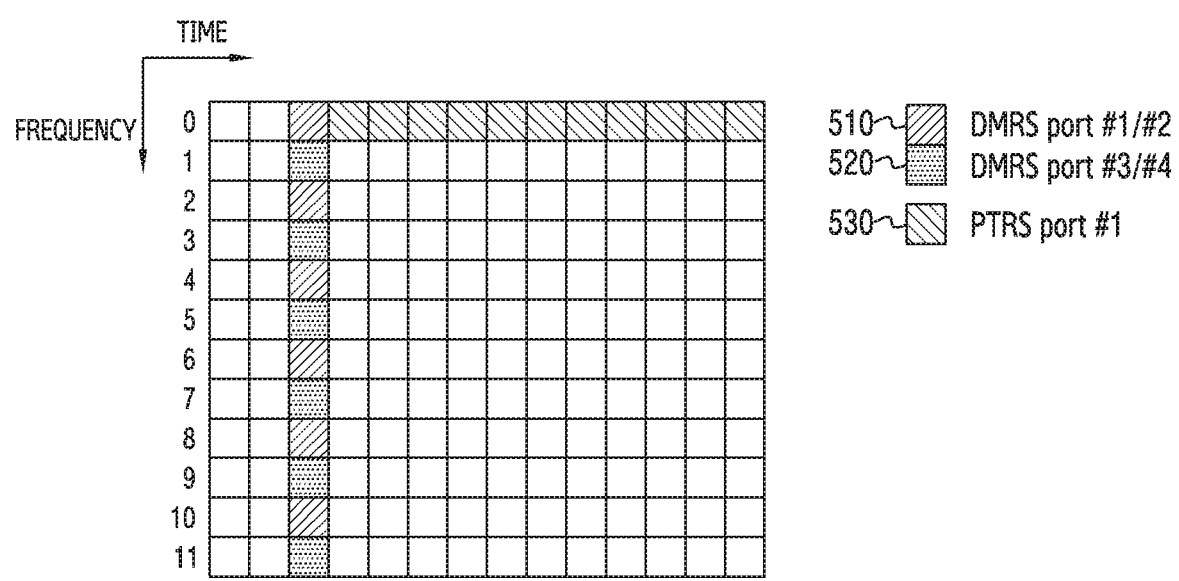
FIG. 5 illustrates an example of association between a demodulation reference signal (DRMS) port belonging to a DMRS group and a PTRS port in a first DMRS configuration in a wireless communication system according to various embodiments of the present disclosure.

FIG. 5 illustrates an example of association between a DRMS port belonging to a DMRS group and a PTRS port in a first DMRS configuration in a wireless communication system according to various embodiments of the present disclosure.

In a cyclic-prefix based orthogonal frequency division multiplexing (CP-OFDM) environment, PTRSs are allocated on the time and frequency axes, and the association of one DMRS port and the PTRS port is required per DMRS group. According to various embodiments of the present disclosure, "DMRS group" indicates a set of DMRS ports, and for example, may indicate a set of DMRS ports which use the same RF chain.

Referring to FIG. 5, four DMRS ports belong to the same DMRS group. In other words, since four DMRS ports use the same RF chain, the number of the PTRS ports may be 1, according to the first characteristic (in the SU-MIMO, the number of the PTRS ports may be equal to the number of RF chains of the transmitting stage) of the PTRS.

According to various embodiments of the present disclosure, the DMRS configuration may include a first DMRS configuration and a second DMRS configuration. For example, the first DMRS configuration may be a configuration for allocating up to four DMRS ports to one symbol as shown in FIG. 5. By contrast, the second DMRS configuration may be a configuration for allocating up to six DMRS ports to one symbol. If one RB includes two such symbols, the second DMRS configuration may be a configuration for allocating up to twelve ports. For example, referring to FIG. 5, four DMRS symbols may be supported in one symbol through a comb structure 2 and a cyclic shift-2. FIG. 5 illustrates, as an embodiment, that DMRS ports #1/#2 510 are supported through the cyclic shift in a first comb structure, and DMRS ports #3/#4 520 are supported through the cyclic shift in the second comb structure.

Next, which DMRS port one PTRS port (e.g., a PTRS port 530) should be associated with is described. For example, the PTRS port 530 may be associated to a DMRS port (i.e., a first DMRS port) of the lowest number among the DMRS ports belonging to the DMRS group. However, referring to FIG. 5, since the first DMRS port is allocated to six REs, which one of the sub-carriers is allocated should be determined. For example, the PTRS port 530 may be allocated to the sub-carrier of the lowest index among the six REs allocated the first DMRS port in shown in FIG. 5. In other words, if one or more DMRS groups include the first DMRS port and the DMRS group including the first DMRS port is allocated to the terminal, the PTRS port 530 may be always mapped to the first DMRS port. Since the DMRS may be code division multiplexing (CDM)ed with a different DMRS, it may be allocated to one or more sub-carriers, and may be also allocated to the sub-carrier of the lowest index. However, since neighboring cells may allocate the PTRS at the same position in the multi-cell environment, allocating the PTRS port 530 to the smallest sub-carrier index of the first DMRS port may cause interference. For example, if neighboring cells form a DMRS group including the first DMRS port, although the number of the DMRS ports included in the DMRS group differs between the cells, since the PTRS is always associated with the sub-carrier to which the first DMRS ports is mapped, collisions may occur between the PTRSs of the multi-cells. In particular, if power boosting of the PTRS is considered, the interference between the PTRSs may cause greater deterioration of phase noise estimation performance and phase noise tracking performance. Hence, a method for controlling the interference by allocating PTRSs of the neighboring cells to different sub-carriers may be demanded. As the method for allocating the PTRSs of the neighboring cells to different sub-carriers, an explicit method and an implicit method may be considered.

Figure 6:
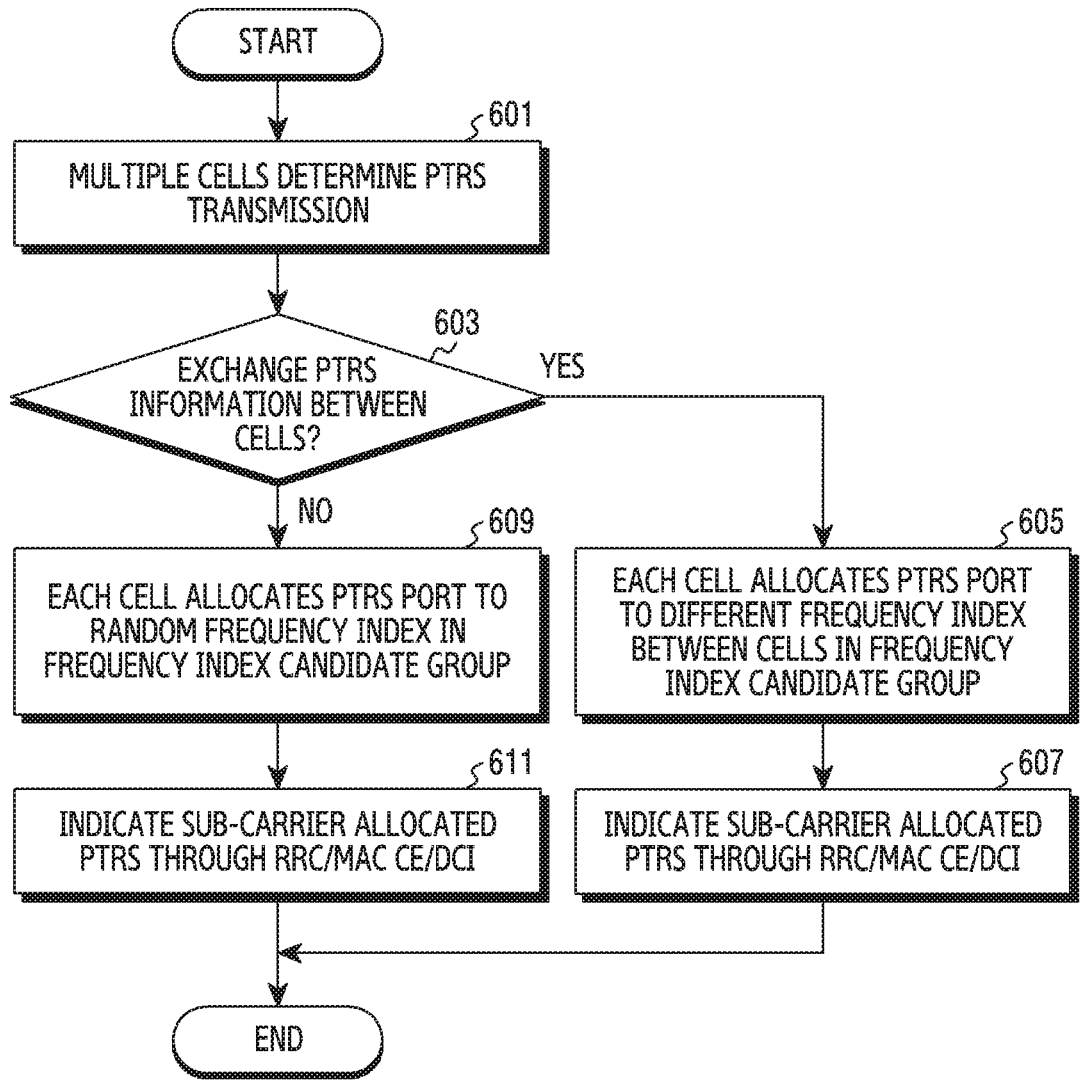
FIG. 6 illustrates a flowchart of a method for explicitly indicating a sub-carrier to which a PTRS is allocated in a wireless communication system according to various embodiments of the disclosure.

FIG. 6 illustrates a flowchart of a method for explicitly indicating a sub-carrier allocated a PTRS in a wireless communication system according to various embodiments of the disclosure. Operations shown in FIG. 6 may be performed in a multi-cell environment. According to various embodiments of the present disclosure, "multi-cell" may have the same meaning as "multi-base station", and one cell may correspond to one base station.

Referring to FIG. 6, in step 601, multiple base stations determine PTRS transmission.

In step 603, the multiple base stations determine whether to exchange PTRS information between cells.

If exchanging the PTRS information between cells, in step 605, each cell allocates a PTRS port to a different frequency index between the cells in a frequency index candidate group based on the exchanged PTRS information. For example, the PTRS information may include information by which a certain base station notifies indication information indicating the sub-carrier of its allocated PTRS port to other base station. Herein, "frequency index candidate group" indicates a set of sub-carriers allocated a DMRS port associated with the PTRS port. For example, if the PTRS port 530 is associated with the first DMRS port as shown in FIG. 5, available sub-carriers for allocating the PTRS may be the sub-carriers of the indexes 0, 2, 4, 6, 8, and 10. For example, in a wireless communication environment including two cells, if all of the two cells set a DMRS group including the first DMRS port and allocate the first DMRS port to the terminal, the terminal of each cell may be allocated the PTRS in the sub-carrier to which the first DMRS port is mapped.

A frequency position of the PTRS allocated to the same DMRS port between the cells may be distinguished as follows. For example, the PTRS may be allocated to different frequency positions in one RB. As shown in FIG. 5, since the DMRS is allocated to several frequency indexes in the RB (to six positions due to the comb structure), collisions between the PTRSs may be avoided, by allocating the PTRS to different DMRS frequency positions between the cells. As yet another example, the PTRS may be allocated to a RB of a different index, and in this case, collisions between the PTRSs may be avoided as well. That is, as described above, since the PTRS may be allocated in various densities such as every RB, every two RBs, or every four RBs on the frequency axis, collisions may be avoided by allocating the PTRS to different RBs according to the frequency pattern.

After step 605, in step 607, each cell may transmit to the terminal the information indicating the sub-carrier allocated the PTRS through one of radio resource control (RRC), media access control (MAC) control element (CE) and downlink control information (DCI). That is, the collisions between the PTRSs may be minimized, by performing on the terminal the signaling (frequency index) for differently allocating the frequency position of the PTRS between the cells in the above-stated method.

By contrast, if not exchanging the PTRS information between the cells, in step 609, each cell allocates the PTRS port to an arbitrary frequency index in the frequency index candidate group. By allocating the PTRS port to the frequency index randomly determined by each cell, collisions between the PTRSs may be avoided to some degree.

After step 609, in step 611, each cell transmits to the terminal the information indicating the sub-carrier to which the PTRS is allocated through one of the RRC, the MAC CE and the DCI.

Figure 7:
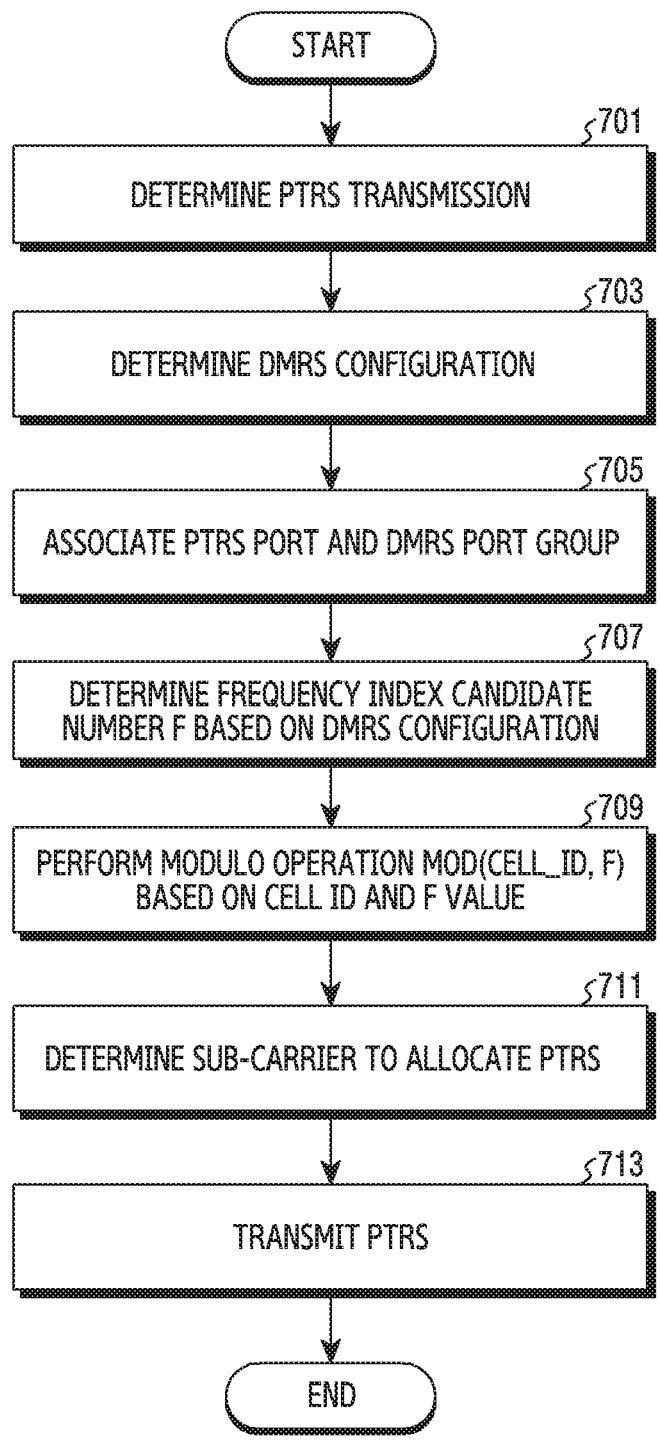
FIG. 7 illustrates a flowchart of a base station for indicating a sub-carrier allocated a PTRS based on a cell identifier (ID) in a wireless communication system according to various embodiments of the disclosure.

FIG. 7 illustrates a flowchart of a base station for indicating sub-carriers allocated a PTRS based on a cell identifier (ID) in a wireless communication system according to various embodiments of the disclosure. FIG. 7 illustrates an operating method of the base station 110.

Referring to FIG. 7, in step 701, the base station determines to transmit a PTRS.

In step 703, the base station determines a DMRS configuration.

In step 705, the base station associates a PTRS port and a DMRS group. For example, the base station maps a PTSR port with one of DMRS ports of the DMRS group.

In step 707, the base station determines the number F of frequency index candidates based on the DMRS configuration. Herein, the frequency index candidate indicates frequency indexes included in a frequency index candidate group.

In step 709, the base station performs a modulo operation based on the cell ID of the base station and the number F of the frequency index candidates, and, in step 711, the base station determines a sub-carrier for allocating the PTRS. For example, if the DMRS configuration is as shown in FIG. 5 and the PTRS port and the first DMRS port are associated, the frequency index candidate group may include six frequency index candidates, and the frequency index (i.e., the sub-carrier) to be allocated the PTRS among the six frequency index candidates may be determined based on the following Equation 1.

$$k_{subcarrier}=\mathrm{mod}(C_{ID},F) \quad \text{Equation 1}$$

Herein, $k_{subcarrier}$ denotes the sub-carrier index to which the PTRS to be transmitted by the base station is to be mapped, $C_{ID}$ denotes the cell ID of the base station, and F denotes the number of the frequency index candidates. The number F of the frequency index candidates may be determined based on a DMRS configuration. For example, the frequency index candidate group in the DMRS configuration of FIG. 5 may be {0, 2, 4, 6, 8, 10} if the PTRS port is mapped to the first or second DMRS port, and may be {1, 3, 5, 7, 9, 11} if the PTRS port is mapped to the third or fourth DMRS port, and the number F of the frequency index candidates has the value of 6 in either case.

For example, if the cell ID of the base station is 1 and F is 6, k=1 and accordingly, the frequency index allocated the PTRS may be '0' if the PTRS port is mapped to the first or second DMRS port in the DMRS structure of FIG. 5 and may be '1' if the PTRS port is mapped to the third or fourth DMRS port. As such, if the base station determines the frequency position of the PTRS based on the cell ID of the base station and the frequency index candidate group based on the DMRS configuration, each base station allocates the PTRS to a different frequency position, and thus interference between PTRSs of neighboring cells may be controlled.

Figure 8:
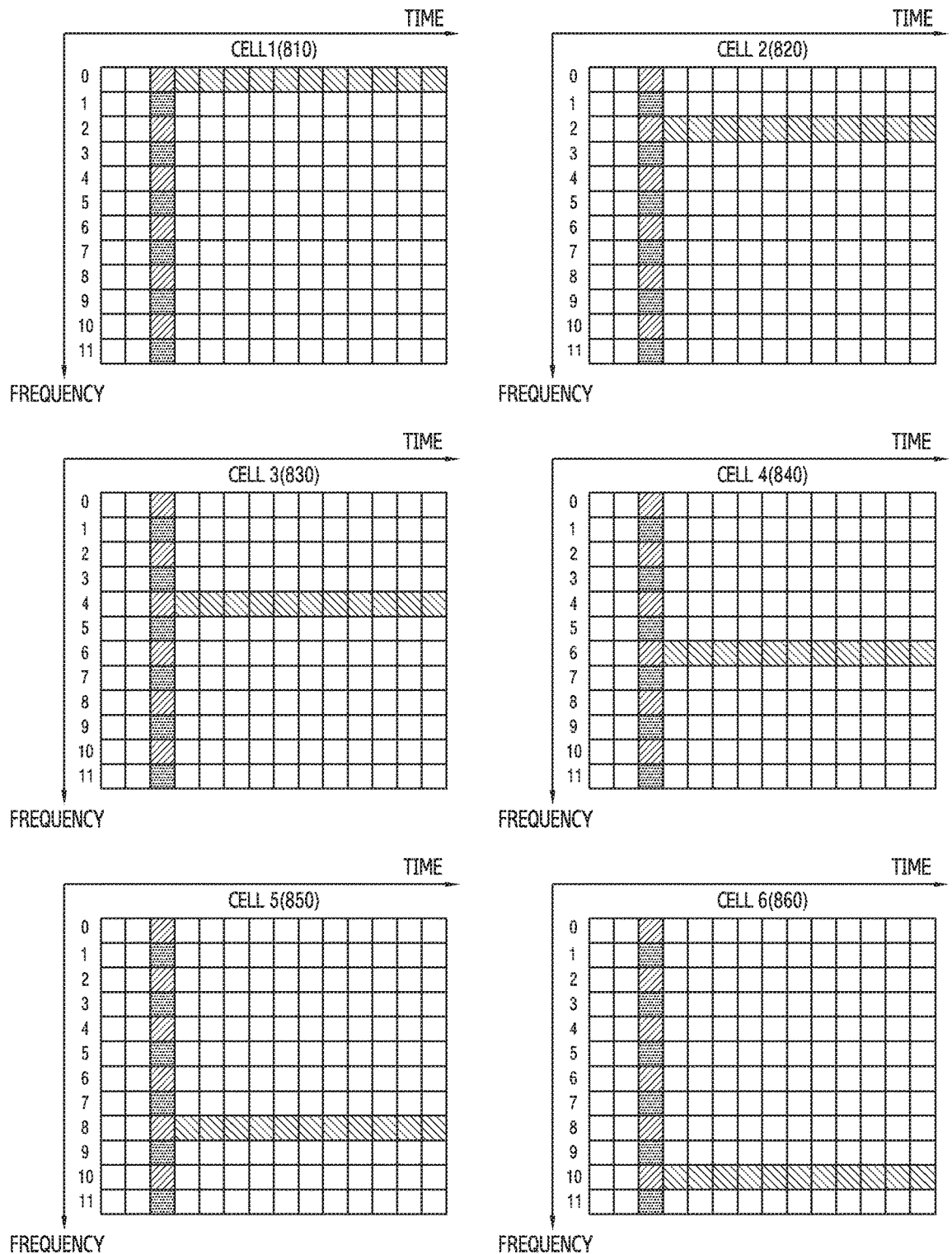
FIG. 8 illustrates an example of a case where six cells allocate a PTRS based on a cell ID in a wireless communication system according to various embodiments of the present disclosure.

FIG. 8 illustrates an example of a case where six cells allocate a PTRS based on a cell ID in a wireless communication system according to various embodiments of the present disclosure. For example, a DMRS group in FIG. 8 may include DMRS ports #1/#2 870 and DMRS ports #3/#4 880. In FIG. 8, a PTRS port 890 is assumed to be associated with the first DMRS port.

As explained in FIG. 7, each cell may allocate the PTRS port 890 to the different frequency position based on the cell ID. For example, a first cell 810 may allocate the PTRS port 890 to sub-carriers of an index 0, a second cell 820 may allocate the PTRS port 890 to sub-carriers of the index 2, a third cell 830 may allocate the PTRS port 890 to sub-carriers of the index 4, a fourth cell 840 may allocate the PTRS port 890 to sub-carriers of the index 6, a fifth cell 850 may allocate the PTRS port 890 to sub-carriers of the index 8, and a sixth cell 860 may allocate the PTRS port 890 to sub-carriers of the index 10. As such, the frequency position of the PTRS port 890 may be differently allocated in each cell based on the cell ID, thus avoiding collisions between the PTRSs without additional signaling overhead.

Figure 9:
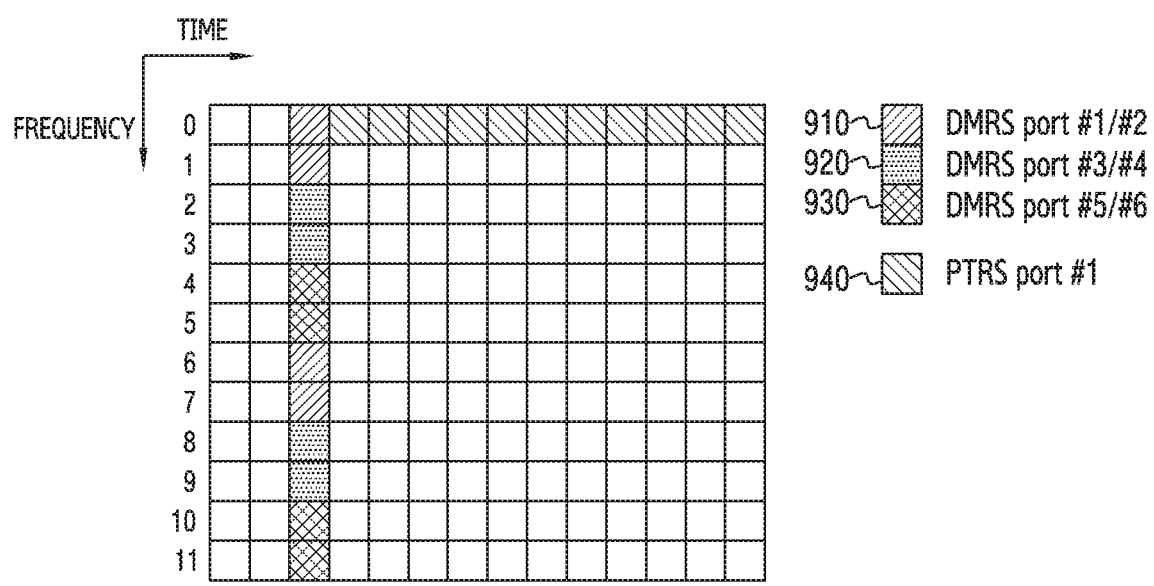
FIG. 9 illustrates an example of association between a DRMS port belonging to a DMRS group and a PTRS port in a second DMRS configuration in a wireless communication system according to various embodiments of the present disclosure.

FIG. 9 illustrates an example of association between a DRMS port belonging to a DMRS group and a PTRS port in a second DMRS configuration in a wireless communication system according to various embodiments of the present disclosure.

As shown in FIG. 9, the second DMRS configuration may allocate up to six DMRS ports to one symbol. In other words, the DMRS group in the second DMRS configuration may include DMRS ports #1/#2 910, DMRS ports #3/#4 920, and DMRS ports #5/#6 930. In this case, regardless of which DMRS port the PTRS port 930 is associated with, the number F of the frequency index candidates may have the value of 4. In other words, in the second DMRS configuration of FIG. 9, the operation of the module 4 needs to be carried out to determine a sub-carrier index to allocate the PTRS port 903. As such, the sub-carrier index to allocate the PTRS port may be determined by setting the number F of the frequency index candidates based on the DMRS configuration, and performing the modulo operation between the cell ID of the base station and F.

According to various embodiments of the present disclosure, the base station may determine an index of an RB for allocating the PTRS using the modulo operation as shown in the following <Equation 2>.

$$\Delta k_{RB} = \mathrm{mod}(C_{ID}, (N_{RB}/F'))$$  Equation 2

Herein, $\Delta k_{RB}$ denotes an offset of a logical RB index for allocating the PTRS. Since the PTRS is allocated within the RB scheduled for the terminal, shifting of the RB unit is applied in the logical RB index. $N_{RB}$ denotes the number of the scheduled RBs, and F' denotes the number of RBs for allocating the PTRS according to the frequency pattern of the PTRS (i.e., whether the PTRS is allocated every RB, allocated every two RBs, allocated every four RBs). For example, if the frequency pattern indicates that the PTRS is allocated every two RBs and the number of the scheduled RBs ($N_{RB}$) is 10, F' becomes 5 and $N_{RB}/F'=2$, and thus the PTRS may be allocated to the RB of an even index or an odd index according to the cell ID.

Figure 10:
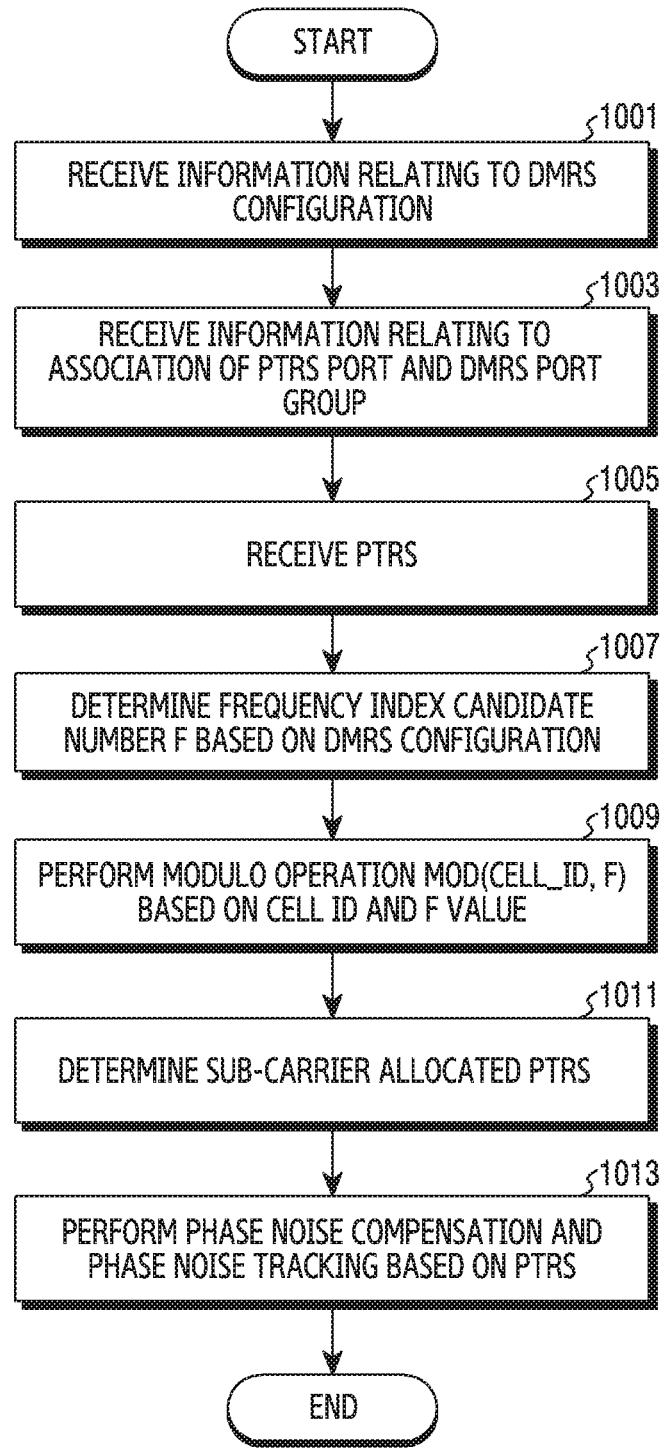
FIG. 10 illustrates a flowchart of a terminal for identifying a sub-carrier allocated a PTRS and compensating for and/or tracking phase noise in a wireless communication system according to various embodiments of the present disclosure.

FIG. 10 illustrates a flowchart of a terminal for identifying a sub-carrier allocated a PTRS and compensating for and/or tracking phase noise in a wireless communication system according to various embodiments of the present disclosure. FIG. 10 illustrates an operating method of the terminal 120.

Referring to FIG. 10, in step 1001, the terminal receives information relating to a DMRS configuration.

In step 1003, the terminal receives information relating to association of a PTRS port and a DMRS group.

In step 1005, the terminal receives the PTRS.

In step 1007, the terminal determines the number F of frequency index candidates based on the DMRS configuration. In other words, the terminal determines the number F of the frequency index candidates for allocating the PTRS based on the DMRS configuration information indicated in step 1001.

In step 1009, the terminal performs a modulo operation mod(cell_ID, F) based on a cell ID and the F value. In other words, the terminal performs the modulo operation based on the cell ID of the base station and the F value as shown in <Equation 1>.

In step 1011, the terminal determines a sub-carrier allocated the PTRS. That is, the terminal determines a frequency position allocated the PTRS based on a modulo operation result and the association information received in step 1003.

In step 1013, the terminal performs phase noise compensation and phase noise tracking based on the PTRS. Thus, the terminal may adequately control a situation in which interference of the PTRS occurs between neighboring cells.

In the above-described examples, it has been explained that one PTRS port is allocated to one DMRS port (e.g., the first DMRS port), which is illustrative, and a plurality of PTRS ports may be allocated to a plurality of DMRS ports. In FIG. 11 through FIG. 14, examples of a case where a plurality of PTRS ports is allocated to a plurality of DMRS ports are described hereafter.

Figure 11:
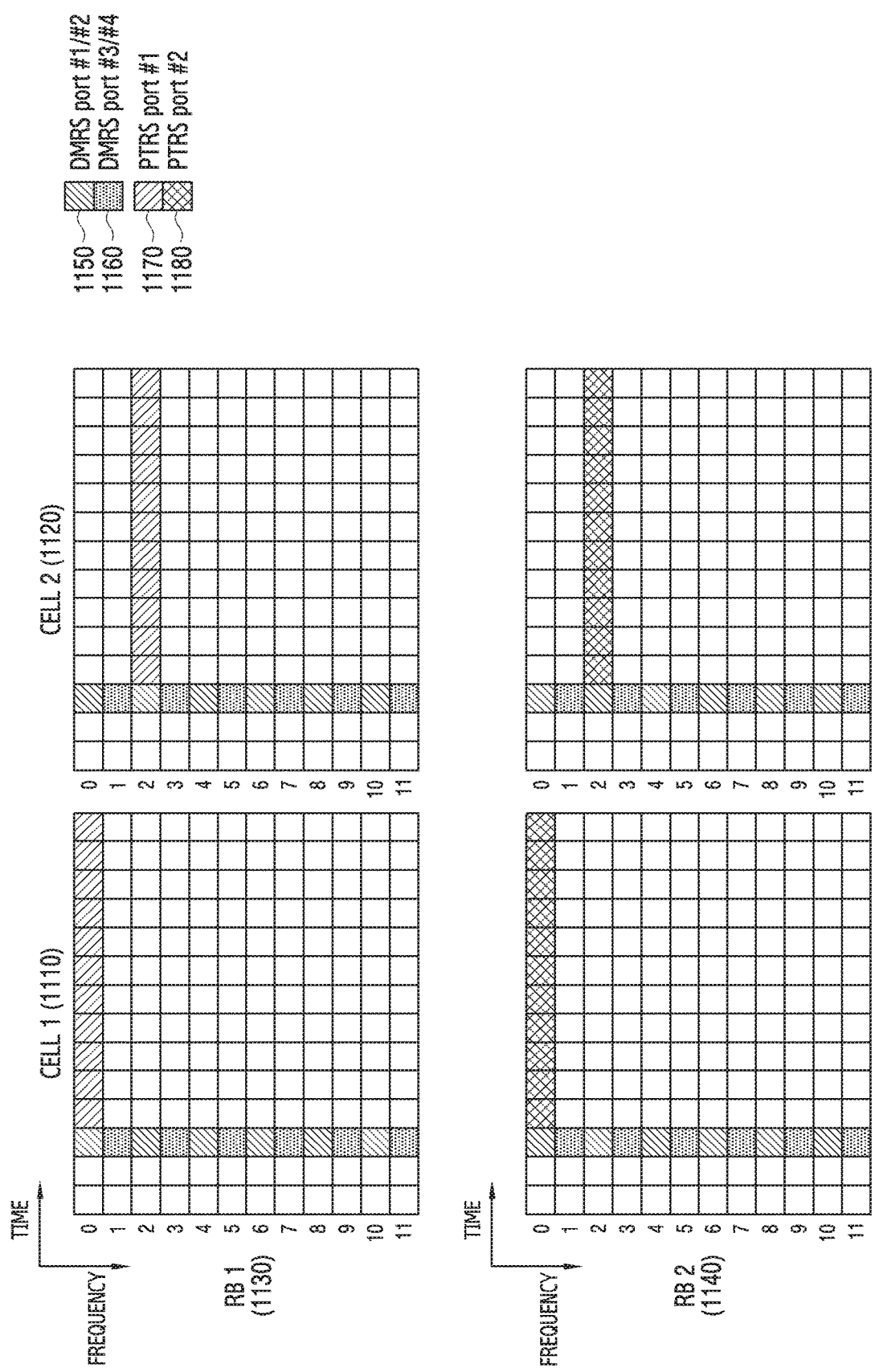
FIG. 11 illustrates an example of a case where frequency positions of a plurality of PTRS ports are determined based on a cell ID and a resource block (RB) offset in a wireless communication system according to various embodiments of the present disclosure.

FIG. 11 illustrates an example of a case frequency positions of a plurality of PTRS ports are determined based on a cell ID and an RB offset in a wireless communication system according to various embodiments of the present disclosure.

FIG. 11 shows that DMRS ports #1/#2 1150 and DMRS ports #3/#4 1160 are allocated according to the first configuration. In FIG. 11, it is assumed that a PTRS port #1 1170 is associated with the DMRS port #1, a PTRS port #2 1180 is associated with the DMRS port #2, and the DMRS port #1 and the DMRS port #2 belong to different DMRS groups.

A first cell 1110 may determine the frequency position of the PTRS port #1 1170 in a first RB 1130 based on a cell ID of the first cell 1110. For example, the first cell 1110 may determine the frequency position of the PTRS port #1 1170 in the first RB 1130 by performing a modulo operation on the cell ID of the first cell 1110 and the number of frequency index candidates corresponding to the first DMRS configuration based on <Equation 1>. In addition, the first cell 1110 may determine an RB (i.e., a second RB 1140) for allocating the PTRS port #2 1180 based on an RB offset. Herein, the RB offset indicates an offset between indexes of RBs allocated the PTRS, and may be determined by the frequency pattern of the PTRS (or, the frequency density of the PTRS). For example, if the PTRS frequency pattern is 2RB, the RB offset may be set to 0 or 1, and if the PTRS frequency pattern is 4RB, the RB offset may be set to 0, 1, 2 or 3. The first cell 1110 may determine the frequency position of the PTRS port #2 1180 in the second RB 1140 based on the cell ID of the first cell 1110. For example, the first cell 1110 may determine the frequency position of the PTRS port #2 1180 in the second RB 1140 by performing the modulo operation on the cell ID of the first cell 1110 and the number of frequency index candidates corresponding to the first DMRS configuration based on <Equation 1>. In addition, the second cell 1120 may also determine the frequency position of the PTRS ports in the same manner as the first cell 1110.

Figure 12:
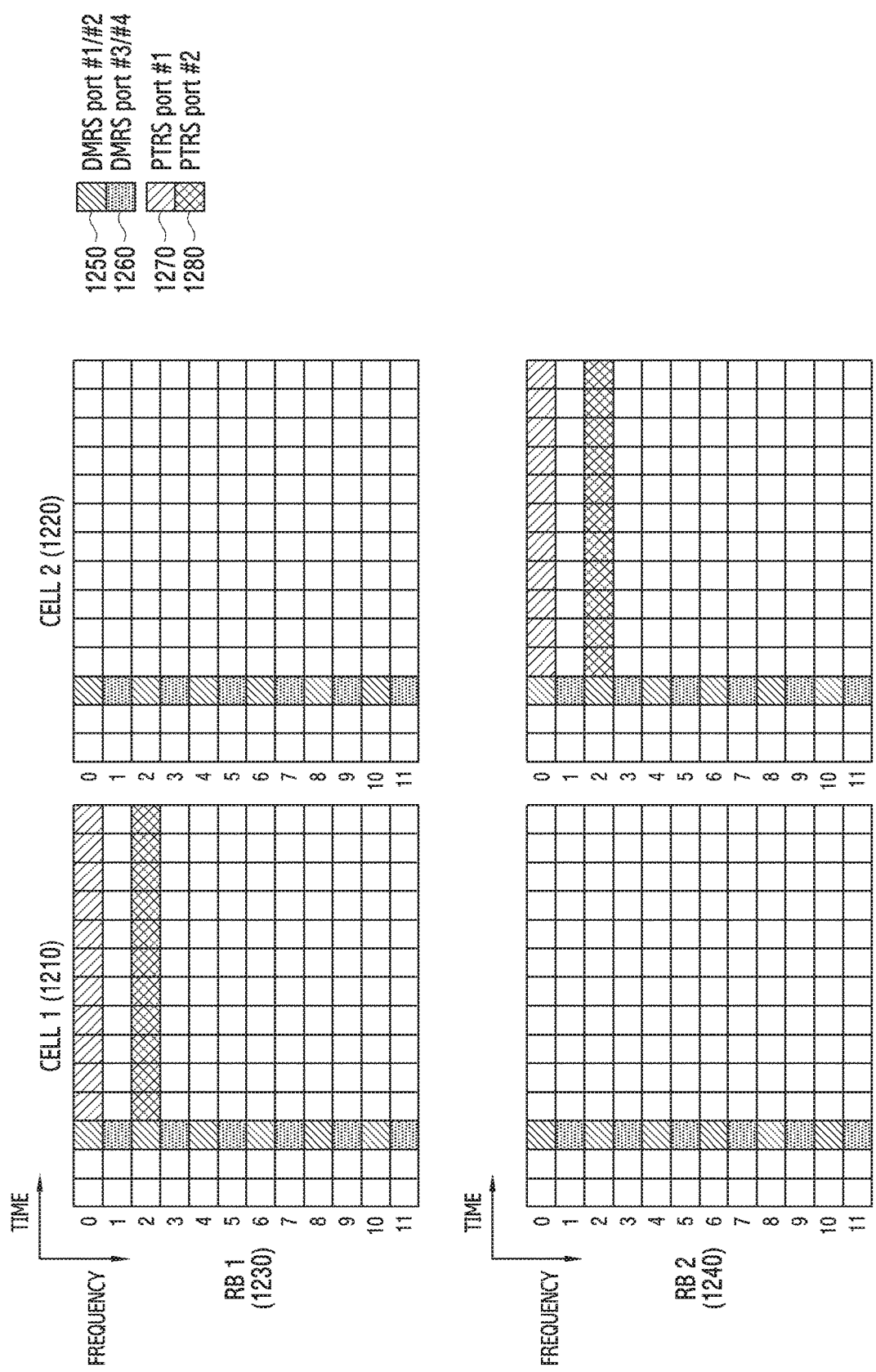
FIG. 12 illustrates an example of a case where frequency positions of a plurality of PTRS ports are determined based on an RB offset in a wireless communication system according to various embodiments of the present disclosure.

FIG. 12 illustrates an example of a case where frequency positions of a plurality of PTRS ports are determined based on an RB offset in a wireless communication system according to various embodiments of the present disclosure.

FIG. 12 illustrates that that DMRS ports #1/#2 1250 and DMRS ports #3/#4 1260 are allocated according to the first configuration. In FIG. 12, it is assumed that a PTRS port #1 1270 is associated with the DMRS port #1, a PTRS port #2 1280 is associated with the DMRS port #2, and the DMRS port #1 and the DMRS port #2 belong to different DMRS groups.

Referring to FIG. 12, a first cell 1210 allocates a plurality of PTRS ports to the same RB (i.e., a first RB 1230), and a second cell 1220 allocates a plurality of PTRS ports to the same RB (i.e., second RB 1240). Herein, the first cell 1210 and the second cell 1220 may allocate the PTRS ports to the different RBs based on an RB offset. For example, the first cell 1210 may provide information relating to the RB allocated its PTRS ports to the second cell 1220. The second cell 1220 may determine the RB offset based on the frequency pattern of the PTRS, and may allocate the PTRS ports to the RB (e.g., the second RB 1240) which is different from the RB allocated the PTRS ports in the first cell by the RB offset. Each cell may sequentially allocate the PTRS ports from the lowest or the highest sub-carrier index in each RB allocated the PTRS ports. For example, as shown in FIG. 12, the first cell 1210 may allocate the PTRS port #1 1270 to the sub-carrier of the lowest index (the sub-carrier of the index 0) among the sub-carriers (the sub-carriers of the indexes 0, 2, 4, 6, 8, and 10) allocated the DMRS port #1/#2 1250 in the first RB 1230, and then allocate the PTRS port #2 1280 to the sub-carrier of the next lowest index (the sub-carrier of the index 2).

Figure 13:
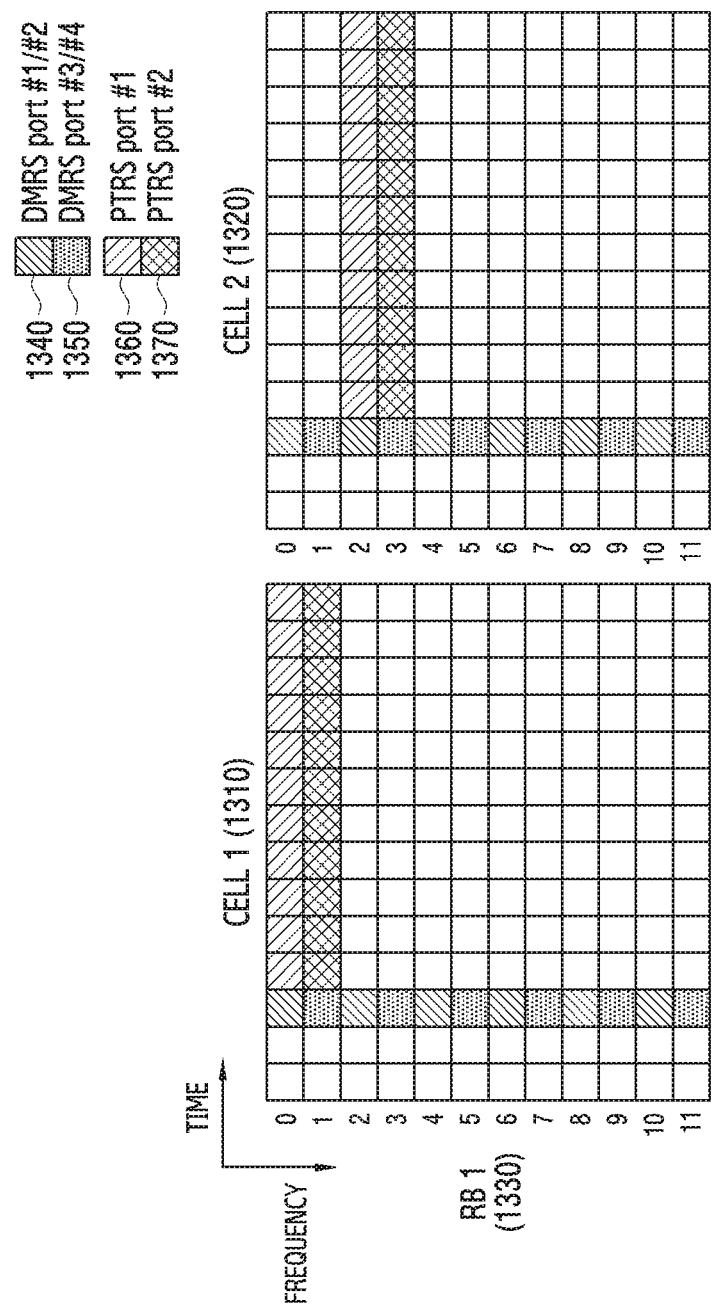
FIG. 13 illustrates an example of a case where frequency positions of a plurality of PTRS ports are determined based on a cell ID in a wireless communication system according to various embodiments of the present disclosure.

FIG. 13 illustrates an example of a case where frequency positions of a plurality of PTRS ports are determined based on a cell ID in a wireless communication system according to various embodiments of the present disclosure.

FIG. 13 illustrates that DMRS ports #1/#2 1340 and DMRS ports #3/#4 1350 are allocated according to the first configuration. In FIG. 13, it is assumed that a PTRS port #1 1360 is associated with the DMRS port #1 or #2, a PTRS port #2 1370 is associated with the DMRS port #3 or #4, and the DMRS port #1/#2 1340 and the DMRS port #3/#4 1350 belong to different DMRS groups. According to the first DMRS configuration, since the DMRS ports #1/#2 1340 and the DMRS ports #3/#4 1350 are allocated to sub-carriers of different indexes, interference may not occur between the PTRS port #1 1360 associated with the DMRS ports #1/#2 1340 and the PTRS port #2 1370 associated with the DMRS ports #3/#4 1350. Hence, a first cell 1310 and a second cell 1320 may allocate the PTRSs to one RB (e.g., a first RB 1330) as shown in FIG. 13. For example, the first cell 1310 may determine a frequency position of the PTRS port #1 1360 and a frequency position of the PTRS port #2 1370 in the first RB 1330 by performing a modulo operation on a cell ID of the first cell 1310 and the number of frequency index candidates corresponding to the first DMRS configuration based on <Equation 1>. The second cell 1320 may also determine the frequency positions of the PTRS ports in the same manner as the first cell 1310.

Figure 14:
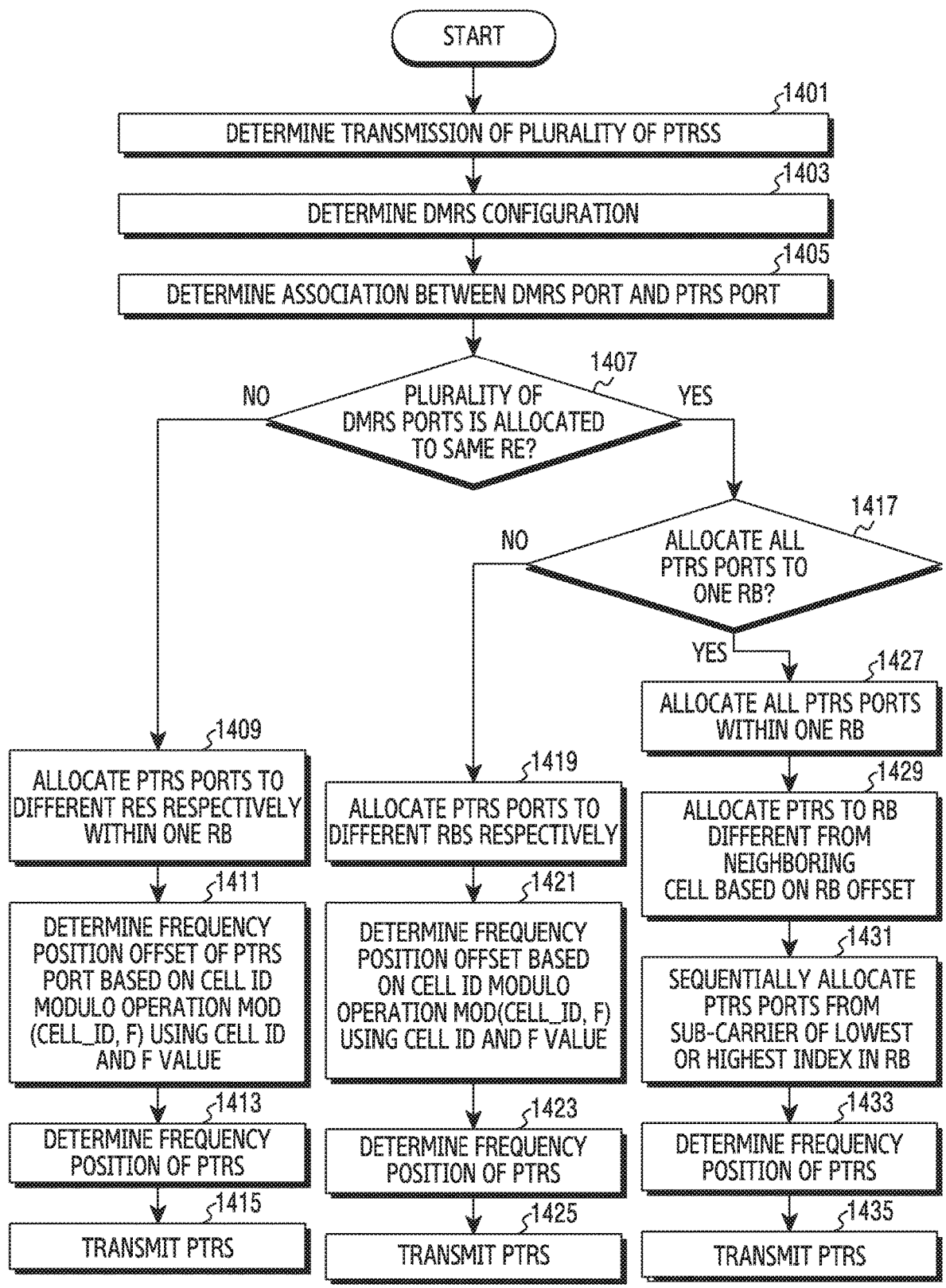
FIG. 14 illustrates a flowchart of a base station for determining frequency positions of a plurality of PTRS ports based on at least one of a cell ID and an RB offset in a wireless communication system according to various embodiments of the present disclosure.

FIG. 14 illustrates a flowchart of a base station for determining frequency positions of a plurality of PTRS ports based on at least one of a cell ID and an RB offset in a wireless communication system according to various embodiments of the present disclosure. FIG. 14 illustrates an operating method of the base station 110.

Referring to FIG. 14, in step 1401, the base station determines transmission of a plurality of PTRSs. That is, the base station determines to transmit the plurality of the PTRSs.

In step 1403, the base station determines a DMRS configuration. For example, the base station may determine one of the first DMRS configuration and the second DMRS configuration, and may determine other DMRS configuration.

In step 1405, the base station determines association between a DMRS port and a PTRS port. For example, the base station may associate a plurality of DMRS ports and a plurality of PTRS ports respectively.

In step 1407, the base station determines whether the plurality of the DMRS ports is allocated to the same resource element (RE). In other words, the base station may determine whether the plurality of the DMRS ports associated with the PTRS ports is allocated to the same sub-carrier.

If determining that the plurality of the DMRS ports is not allocated to the same RE (i.e., if the plurality of the DMRS ports is allocated to different REs) in step 1407, the base station determines to allocate the PTRS ports to different REs within one RB in step 1409.

In step 1411, the base station determines a frequency position offset of the PTRS ports based on a cell ID. For example, the base station may determine the frequency position offset for the PTRS ports each by performing a modulo operation between the number of frequency index candidates corresponding to the DMRS, and the cell ID based on <Equation 1>.

In step 1413, based on the frequency position offset, the base station determines the frequency position for each of the PTRS ports.

In step 1415, the base station transmits a plurality of the PTRSs at the determined frequency position.

If determining that a plurality of DMRS ports is allocated to the same RE in step 1407, the base station determines whether to allocate all the PTRS ports for one RB in step 1417.

If the base station determines not to allocate all the PTRS ports for one RB in step 1417, the base station allocates the PTRS ports to different RBs respectively, in step 1419.

In step 1421, the base station determines a frequency position offset of each PTRS port to be allocated to each RB based on a cell ID. For example, the base station may determine the frequency position offset of each PTRS port to be allocated to each RB by performing a modulo operation between the number of frequency index candidates corresponding to the DMRS configuration, and the cell ID based on <Equation 1>.

In step 1423, the base station determines the frequency position of each PTRS port to be allocated to each RB, based on the frequency position offset.

In step 1425, the base station transmits a plurality of PTRSs at the determined frequency position.

If the base station determines to allocate all of the PTRS ports for one RB in step 1417, the base station allocates a plurality of PTRS ports within one RB in step 1427.

In step 1429, the base station allocates a PTRS to an RB different from a neighboring cell based on an RB offset. For example, the base station may determine the RB offset based on the frequency pattern of the PTRS, and allocate the PTRS to the different RB from the neighboring cell based on the RB offset and information shared with the neighboring cell.

In step 1431, the base station sequentially allocates the PTRS ports from a sub-carrier of the lowest or the highest index in the RB.

In step 1433, the base station determines the frequency position of the PTRS.

In step 1435, the base station transmits a plurality of PTRSs at the determined frequency position.

Figure 15:
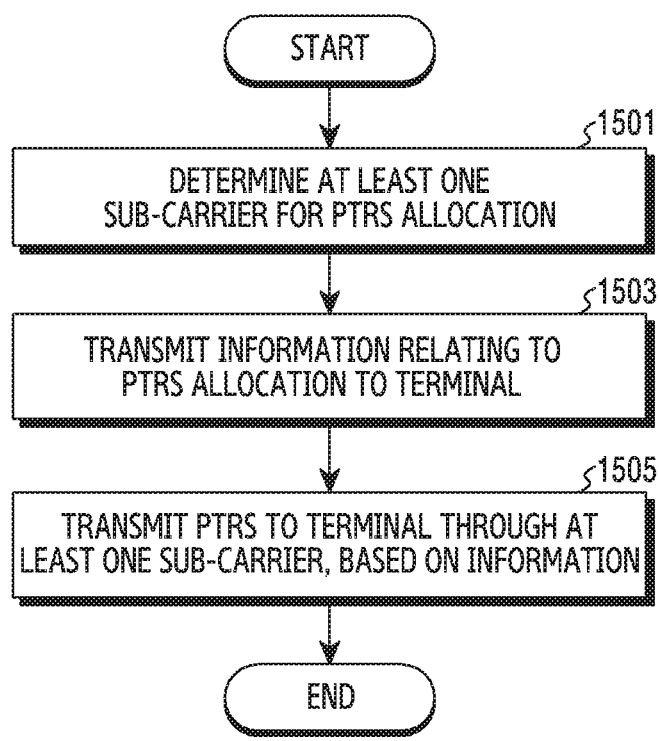
FIG. 15 illustrates a flowchart of a base station in a wireless communication system according to various embodiments of the present disclosure.

FIG. 15 illustrates a flowchart of a base station in a wireless communication system according to various embodiments of the present disclosure. FIG. 15 illustrates an operating method of the base station 110.

Referring to FIG. 15, in step 1501, the base station determines at least one sub-carrier for PTRS allocation.

According to various embodiments of the present disclosure, to determine at least one sub-carrier, the base station may receive indication information indicating the sub-carrier to which other base station allocates the PTRS, from other base stations, and, based on such indication information, determine at least one sub-carrier which is different from the sub-carrier to which the other base station allocates the PTRS.

According to various embodiments of the present disclosure, the at least one sub-carrier may be randomly selected from available sub-carriers for allocating the PTRS.

According to various embodiments of the present disclosure, the base station may determine the number of available sub-carriers for allocating the PTRS based on a DMRS configuration, perform a modulo operation (e.g., <Equation 1>) on the cell ID of the base station and the number of the available sub-carriers, and determine at least one sub-carrier, based on a modulo operation result and information relating to a DMRS port associated with a PTRS port of the PTRS. In addition, the base station may allocate a PTRS to the determined sub-carrier.

In step 1503, the base station transmits to the terminal information relating to the PTRS allocation.

According to various embodiments of the present disclosure, the information relating to the PTRS allocation may include information indicating at least one sub-carrier allocated the PTRS. In addition, the information relating to the PTRS allocation may include information relating to the DMRS configuration, and information relating to the DMRS port associated with the PTRS port of the PTRS. In other words, the information relating to the PTRS allocation may include at least one of information indicating at least one sub-carrier allocated the PTRS, the DMRS configuration information and/or the information relating to the DMRS port associated with the PTRS port of the PTRS. The information relating to the PTRS allocation may be transmitted through one of the MAC CE, the RRC and the DCI.

In step 1505, based on the information relating to the PTRS allocation, the base station transmits the PTRS to the terminal through the determined at least one sub-carrier.

According to various embodiments of the present disclosure, a resource block allocated the PTRS may be determined based on the number of RBs scheduled for the terminal, the number of RBs for allocating the PTRS among the RBs scheduled for the terminal, and a cell ID of the base station. For example, the resource block allocated the PTRS may be determined by the modulo operation based on <Equation 2>.

Figure 16:
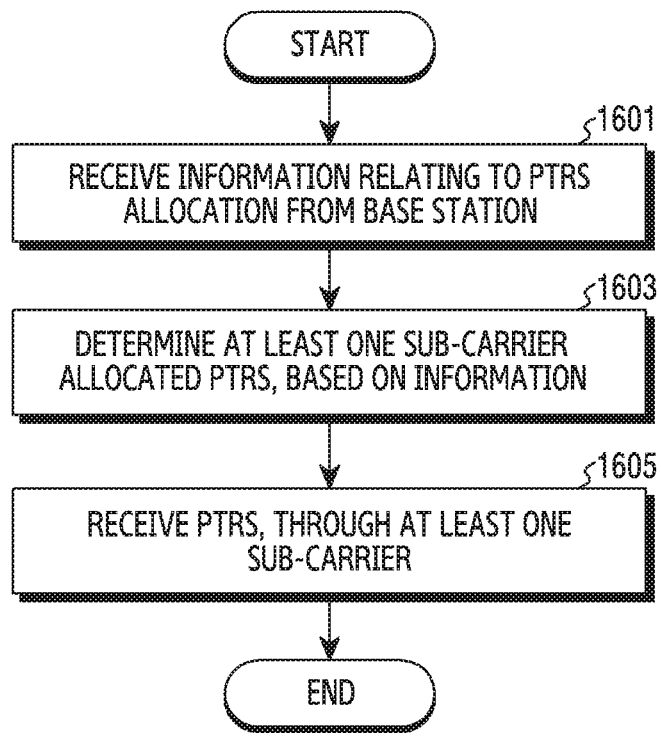
FIG. 16 illustrates a flowchart of a terminal in a wireless communication system according to various embodiments of the present disclosure.

FIG. 16 illustrates a flowchart of a terminal in a wireless communication system according to various embodiments of the present disclosure. FIG. 12 illustrates an operating method of the terminal 120.

Referring to FIG. 16, in step 1601, the terminal receives information relating to PTRS allocation from a base station.

According to various embodiments of the present disclosure, the information relating to the PTRS allocation may include information indicating at least one sub-carrier allocated the PTRS. In addition, the information relating to the PTRS allocation may include information relating to a DMRS configuration, and information relating to a DMRS port associated with a PTRS port of the PTRS. In other words, the information relating to the PTRS allocation may include at least one of information indicating at least one sub-carrier allocated the PTRS, DMRS configuration information and/or the information relating to the DMRS port associated with the PTRS port of the PTRS. The information relating to the PTRS allocation may be received through one of the MAC CE, the RRC and the DCI.

In step 1603, based on the information relating to the PTRS allocation, the terminal determines at least one sub-carrier allocated the PTRS.

According to various embodiments of the present disclosure, to determine at least one sub-carrier, the terminal may determine the number of available sub-carriers for allocating the PTRS, based on the DMRS configuration, perform a modulo operation (e.g., <Equation 1>) on the cell ID of the base station and the number of the available sub-carriers for allocating the PTRS, and determine at least one sub-carrier based on a modulo operation result and the information relating to the DMRS port associated with the PTRS port.

In step 1605, the terminal receives the PTRS, through the determined at least one sub-carrier. Although not depicted, based on the received PTRS, the terminal may compensate a data signal received from the base station for phase noise, and/or track the phase noise.

According to various embodiments of the present disclosure, a resource block allocated the PTRS may be determined based on the number of RBs scheduled for the terminal, the number of RBs for allocating the PTRS among the RBs scheduled for the terminal, and the cell ID of the base station. For example, the resource block allocated the PTRS may be determined by the modulo operation based on <Equation 2>.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

What is claimed is:

1. A method performed by a base station in a wireless communication system, the method comprising:
    determining a demodulation reference signal (DMRS) configuration for a DMRS group;
    associating a port of phase tracking reference signal (PTRS) with a DMRS port of a lowest number among DMRS ports of the DMRS group;
    determining a number F of frequency index candidates included in each of a plurality of frequency index candidate groups based on the associated DMRS port and the DMRS configuration, wherein each of the plurality of frequency index candidate groups has an identical number of frequency index candidates;
    performing a modulo operation of a cell identifier of the base station and the number F;
    determining one of the plurality of frequency index candidate groups based on the DMRS port associated with the port of the PTRS;
    receiving from another base station, indication information indicating a sub-carrier allocated the PTRS by the other base station;
    determining at least one sub-carrier for allocating a PTRS from the determined frequency index candidate group based on a result of the modulo operation and the indication information;
    transmitting information relating to the PTRS allocation to a terminal; and
    transmitting the PTRS to the terminal through the at least one sub-carrier based on the information;
    wherein the frequency index candidate group indicates a set of sub-carriers allocated the DMRS port with a PTRS port.

2. The method of claim 1, further comprising:
    allocating the PTRS to the at least one sub-carrier.

3. The method of claim 1, wherein the information relating to the PTRS allocation comprises at least one of information indicating the at least one sub-carrier, information relating to the DMRS configuration, and information of a DMRS port associated with a PTRS port of the PTRS.

4. The method of claim 1, wherein a resource block (RB) allocated the PTRS is determined based on the number of RBs scheduled for the terminal, the number of available RBs for allocating the PTRS among the RBs scheduled for the terminal, and a cell ID of the base station.

5. The method of claim 1, wherein the frequency index candidates indicate frequency indexes included in a frequency index candidate group.

6. A method performed by a terminal in a wireless communication system, the method comprising:
    receiving information relating to phase tracking reference signal (PTRS) allocation from a base station;
    determining at least one sub-carrier allocated the PTRS, based on the information; and
    receiving the PTRS, through the at least one sub-carrier,
    wherein the PTRS allocation is determined based on a modulo operation of a cell identifier of the base station and a number F of frequency index candidates included in each of a plurality of frequency index candidate groups, wherein each of the plurality of frequency index candidate groups has an identical number of frequency index candidates, and indication information indicating a sub-carrier allocated the PTRS by another base station,
    wherein the frequency index candidates are determined based on a demodulation reference signal (DMRS) configuration and a DMRS port associated with a port of the PTRS,
    wherein the DMRS port is a DMRS port of a lowest number among DMRS ports of a DMRS group associated with the DMRS configuration, and
    wherein the frequency index candidate group indicates a set of sub-carriers allocated the DMRS port with a PTRS port.

7. The method of claim 6,
    wherein the information relating to the PTRS allocation comprises information relating to the DMRS configuration.

8. The method of claim 6, further comprising:
    performing at least one of phase noise compensation and phase noise tracking on a data signal received from the base station based on the received PTRS.

9. The method of claim 6, wherein the information relating to the PTRS allocation comprises at least one of information indicating the at least one sub-carrier, information relating to the DMRS configuration, and information of a DMRS port associated with a PTRS port of the PTRS.

10. The method of claim 6, wherein a resource block (RB) allocated the PTRS is determined based on the number of RBs scheduled for the terminal, the number of available RBs for allocating the PTRS among the RBs scheduled for the terminal, and a cell ID of the base station.

11. An apparatus of a base station in a wireless communication system, the apparatus comprising:
    a transceiver; and
    at least one processor operably coupled to the transceiver, and configured to:
        determine a demodulation reference signal (DMRS) configuration for a DMRS group,
        associate a port of phase tracking reference signal (PTRS) with a DMRS port of a lowest number among DMRS ports of the DMRS group,
        determine a number F of frequency index candidates included in each of a plurality of frequency index candidate groups based on the associated DMRS port and the DMRS configuration, wherein each of the plurality of frequency index candidate groups has an identical number of frequency index candidates,
perform a modulo operation of a cell identifier of the base station and the number F,
determine one of the plurality of frequency index candidate groups based on the DMRS port associated with the port of the PTRS,
receive from another base station, indication information indicating a sub-carrier allocated the PTRS by the other base station,
determine at least one sub-carrier for a PTRS allocation from the determined frequency index candidate group based on a result of the modulo operation and the indication information,
transmit information relating to the PTRS allocation to a terminal, and
transmit the PTRS to the terminal through the at least one sub-carrier, based on the information,
wherein the frequency index candidate group indicates a set of sub-carriers allocated the DMRS port with a PTRS port.

12. The apparatus of claim 11, wherein the at least one processor is further configured to:
allocate the PTRS to the at least one sub-carrier.

13. The apparatus of claim 11, wherein the information relating to the PTRS allocation comprises at least one of information indicating the at least one sub-carrier, information relating to the DMRS configuration, and information of a DMRS port associated with a PTRS port of the PTRS.

14. The apparatus of claim 11, wherein a resource block (RB) allocated the PTRS is determined based on the number of RBs scheduled for the terminal, the number of available RBs for allocating the PTRS among the RBs scheduled for the terminal, and a cell ID of the base station.

* * * * *